United States Patent [19]

Broekhuis

[11] Patent Number: 4,539,136

[45] Date of Patent: Sep. 3, 1985

[54] PROCESS FOR THE PREPARATION OF BRANCHED POLYMERS

[75] Inventor: Antonius A. Broekhuis, Amsterdam, Netherlands

[73] Assignee: Shell Oil Company, Houston, Tex.

[21] Appl. No.: 571,322

[22] Filed: Jan. 16, 1984

[30] Foreign Application Priority Data

Sep. 28, 1983 [GB] United Kingdom ............... 8326014

[51] Int. Cl.³ ............................................ C08F 297/04
[52] U.S. Cl. .................................... 525/250; 525/271; 525/314; 525/340; 525/194
[58] Field of Search ............... 525/250, 255, 271, 314, 525/340, 194

[56] References Cited

U.S. PATENT DOCUMENTS 3,803,266  4/1974  Kahle et al. ..................... 525/271

Primary Examiner—Wilbert J. Briggs, Sr.
Attorney, Agent, or Firm—Peter Bielinski

[57] ABSTRACT

The invention provides a process for the preparation of a branched polymer which comprises contacting a monovinyl aromatic monomer having from 8 to 18 carbon atoms per molecule with an organolithium initiator, thereafter adding at least one conjugated diene monomer having from 4 to 12 carbon atoms per molecule and thereafter adding a tris-(nonylated phenyl)-phosphite as coupling agent in an amount from 0.15 to 1.1 mol per mol of the organolithium initiator.

5 Claims, No Drawings

PROCESS FOR THE PREPARATION OF BRANCHED POLYMERS

This invention relates to a process for the preparation of branched polymers and to the polymers whenever produced by the process.

It is known to produce branched or radial block copolymers by initiating the polymerization of a vinyl substituted aromatic compound with an organometal compound, which is advantageously an organolithium compound, thereafter adding a conjugated diene, and coupling the resulting block copolymer chains by addition of a polyfunctional coupling agent.

U.S. Pat. No. 3,803,266 discloses the use of triaryl phosphites and trialkyl phosphites as coupling agents in such processes. Suitable aryl phosphites are said to be those wherein the aryl radical is phenyl or hydrocarbon-substituted phenyl having up to 12 carbon atoms total. Suitable alkyl phosphites are said to be those wherein the alkyl radical contains 1 to 10 carbon atoms, preferably 1 or 2. However, in the single working example given, the phosphite is triethyl phosphite, which is used in a concentration of 0.3 mol per mol of lithium initiator.

In Japanese Patent application J No. 53-67791 a process is disclosed for the polymerization of at least one conjugated diene and optionally at least one vinyl aromatic compound in an inert solvent using an Alfin catalyst which comprises an alkenyl sodium, wherein the polymerization was terminated before all monomer had reacted by the addition of at least 20 mol % of a phosphate or phosphite triester per mol alkenyl sodium. Use of tri-nonylphenyl phosphite and tri-n-butyl phosphate as polymerization terminators is exemplified. The polymerization terminators were introduced to polymerizates at 68% to 76% conversion. No increase in viscosity and no gel formation were observed.

In processes wherein polyfunctional coupling agents are employed for the preparation of branched polymers having three or more polymer chains coupled to one another, polymer species having a number of polymer arms which is lower than the number which may be expected based on the functionality of the coupling agent will always be present. The extent to which this occurs depends primarily on the molar ratio in which the coupling agent and the anion-terminated polymer chains are reacted. Generally when the molar amount of anion-terminated polymer chains per mol of coupling agent is greater than the coupling functionality of the coupling agent the resulting polymer is a mixture of predominantly highly branched polymer species and linear anion terminated polymer chains. However, if the molar amount of anion-terminated polymer chains per mol of coupling agent is lower than the coupling-functionality, the ultimate polymer product tends to comprise a mixture of polymer species with a varying number of arms, i.e., linear uncoupled polymer chains, linear coupled polymer chains, and branched polymer species of which the number of arms may vary, depending on the functionality of the coupling agent.

In the case of tri-functional coupling agents it is generally the case that polymer compositions having a high content of branched polymer species are only produced if the molar ratio of coupling agent to anion-terminated polymer chains, and thus when an organolithium initiator is used the molar ratio of coupling agent to organolithium initiator, is within a relatively narrow range.

It has now surprisingly been found that tris-(nonylated phenyl)phosphites may be used as coupling agents in a process for the preparation of branched polymers and that high yields of branched polymer are obtained over a wide range of molar ratios of coupling agent to organolithium initiator.

According to the present invention there is provided a process for the preparation of branched polymer which comprises contacting a monovinyl aromatic monomer having from 8 to 18 carbon atoms per molecule with an organolithium initiator, thereafter adding at least one conjugated diene monomer having from 4 to 12 carbon atoms per molecule and thereafter adding a phosphite triester as coupling agent, characterized in that the phosphite triester is a tris-(nonylated phenyl)phosphite added in an amount from 0.15 to 1.1 mol per mol of the organolithium initiator.

Tris-(nonylated phenyl)phosphites are known compounds which are sold commercially as stabilizer-antioxidants for prevention of oxidative degradation of polymers, under a variety of trade names, e.g., "Polygard" (registered trade mark), "Naugard" (registered trade mark), "Antigene TNP" (registered trade mark), "Anullex TNPP" (registered trade mark), "Irgafos TNPP" (registered trade mark) and "Nocrac TNP" (registered trade mark). "Polygard" is described as being a tri(mixed mono- and dinonylphenyl)phosphite (Polygard Technical Bulletin No. 15; March 1964, ex Uniroyal).

The molar ratio of tris-(nonylated phenyl)phosphite to organolithium initiator is preferably in the range 0.2 to 0.6; more preferably 0.25 to 0.5:1, and advantageously in the range 0.3 to 0.4:1.

The monovinyl-substituted aromatic monomer employed in the process of the invention is preferably one or more styrenes, optionally substituted by one or more alkyl, cycloalkyl or aryl substituents, or a vinyl naphthalene. Examples of suitable such monomers include: styrene, 3-methylstyrene, 4-n-propylstyrene, 4-cyclohexylstyrene, 4-decylstyrene, 2-ethyl-4-benzylstyrene, 4-p-tolylstyrene, 1-vinyl-naphthalene, 2-vinylnaphthalene. Styrene is the most preferred aromatic monomer.

The conjugated diene monomer employed in the process of the present invention is preferably one containing from 4 to 8 carbon atoms. Examples of suitable such conjugated diene monomers include: 1,3-butadiene, isoprene, 2,3-dimethyl-1,3-butadiene, and piperylene; 1,3-butadiene is particularly preferred.

The polymerization initiator employed in the process according to the invention is preferably a hydrocarbyl monolithium compound, which can be represented by the formula RLi, wherein R is a hydrocarbon radical selected from aliphatic, cycloaliphatic or aromatic radicals containing for example from 1 to 20 carbon atoms per molecule. Examples of such initiators include: n-butyllithium, sec-butyllithium, methyllithium, phenyllithium, naphthyllithium, p-tolyllithium, cyclohexyllithium, and eicosyllithium. Sec-butyllithium is a preferred initiator.

The process of the invention may conveniently be effected in the presence of a hydrocarbon solvent such as an aliphatic, cycloaliphatic or aromatic hydrocarbon having 4 to 10 carbon atoms, or mixtures thereof. Examples of such hydrocarbon solvents include: n-hexane, n-heptane, 2,2,4-trimethylpentane, cyclohexane, benzene and toluene. The reaction is generally carried out with a weight ratio of solvent to monomers greater than 1:1. Preferably the solvent is employed in an amount in the range 400 to 1500 parts per 100 parts by weight of total monomers.

Reaction between the organolithium initiator and the monomers may typically be complete in a period of time ranging from a few minutes to about 6 hours, more specifically about 10 minutes to about 2.5 hours. Polymerization temperature is not critical and will generally be in a range −20° C. to 150° C., preferably in the range 30° C. to 90° C.

Addition of monomers can be carried out via a single or multiple addition procedure. Generally when block copolymers are prepared the monomer addition is carried out in two consecutive additions, each addition having a composition corresponding with the composition of the polymer block.

On completion of the polymerization tris-(nonylated phenyl)-phosphite is added before addition of any other material which might terminate the polymerization reaction or displace lithium atoms from polymer chains formed in the reaction mixture. The temperature at which the coupling reaction is carried out can vary over a broad range and for convenience is often the same as the temperature of polymerization. Coupling will typically be complete in 1 to 60 minutes. Longer coupling times may be required at lower temperatures.

The invention will be further understood from the following description of specific examples thereof.

In each of the examples and comparative examples polymerization was carried out by introducing 12 g styrene monomer into 250 ml cyclohexane in a rubber capped serum bottle, which was used as reaction vessel. The serum bottles were subsequently placed in a thermostatted water bath, provided with a tumbling mechanism for the bottles, to ensure homogeneity of the reaction mixture. The temperature of the bath was set at 50° C. Upon reaching this temperature polymerization was initiated by introducing 0.85 mmol of sec-butyllithium into the bottle, using a micro syringe, (as a cyclohexane solution of concentration 200 mmole initiator per liter). Upon completion of the styrene polymerization which was achieved within 30 minutes, a sample was taken for molecular weight determination, and the bottles were cooled to 20° C. Subsequently 29 g 1,3-butadiene (liquified at −30° C.) were introduced, the bottles were replaced in the thermostatted bath and polymerization continued. When all the 1,3-butadiene had reacted which required approximately 90 minutes a sample was taken for molecular weight determination and subsequently the appropriate amount of the phosphite triester coupling agent (tris-(nonylated phenyl)phosphite or one of the trialkylphosphites used) was added (as a 10% w/w solution in cyclohexane) to arrive at a desired molar ratio of coupling agent to lithium terminated styrene-butadiene block copolymer.

The coupling reaction was allowed to proceed at 50° C. for 30 minutes whereupon the contents of the reactor were stabilized by the addition of 2,6-di-t-butylcresol. Subsequently the contents of the serum bottles were transferred to round bottomed reactors to isolate the polymer by steam coagulation followed by drying at 50° C. in vacuo.

The apparent molecular weights of the different samples were determined by gel permeation chromatography (GPC), using Waters Associates—440 equipment calibrated with polystyrene of known molecular weight.

Results are given in Table 1 following. Examples 1 to 6 are in accordance with the invention, Examples a to g being comparative examples.

TABLE 1

| | | | Apparent mol wt ($\times 10^3$) | | | Relative weight percentages of different species* in coupled polymer product | | |
|---|---|---|---|---|---|---|---|---|
| | Coupling Agent | Coupling agent/ sec-butyllithium mol ratio | uncoupled linear polymer | coupled linear polymer | branched polymer | uncoupled linear polymer | coupled linear polymer | branched polymer |
| Example Number | | | | | | | | |
| 1 | "Polygard HR" (registered trade mark) | 0.19:1 | 84 | — | 225 | 54 | — | 46 |
| 2 | "Polygard HR" (registered trade mark) | 0.24:1 | 84 | — | 220 | 40 | — | 60 |
| 3 | "Polygard HR" (registered trade mark) | 0.35:1 | 92 | — | 248 | 17 | — | 83 |
| 4 | "Polygard HR" (registered trademark) | 0.45:1 | 86 | — | 240 | 28 | — | 72 |
| 5 | "Polygard HR" (registered trademark) | 0.60:1 | 85 | 168 | 235 | 47 | 5 | 48 |
| 6 | "Polygard HR" (registered trademark) | 1.05:1 | 90 | 180 | 250 | 75 | 10 | 15 |
| Comparative Examples | | | | | | | | |
| a | $(C_2H_5O)_3P$ | 0.35:1 | 80 | 160 | 220 | 17 | 15 | 68 |
| b | $(C_2H_5O)_3P$ | 0.47:1 | 82 | 160 | 225 | 29 | 23 | 48 |
| c | $(C_2H_5O)_3P$ | 0.8:1 | 80 | 160 | 225 | 50 | 25 | 25 |
| d | $(C_6H_{13}O)_3P$ | 0.31:1 | 80 | 160 | 220 | 27 | 4 | 69 |
| e | $(C_6H_{13}O)_3P$ | 0.67:1 | 100 | 165 | 238 | 53 | 23 | 24 |
| f | $(C_{12}H_{25}O)_3P$ | 0.31:1 | 78 | 158 | 210 | 30 | 11 | 59 |
| g | $(C_{12}H_{25}O)_3P$ | 0.67:1 | 80 | 160 | 220 | 59 | 34 | 7 |

*Based on GPC peak areas.

What is claimed is:

1. A process for the preparation of a branched polymer which comprises contacting a monovinyl aromatic monomer having from 8 to 18 carbon atoms per molecule with an organolithium initiator, thereafter adding at least one conjugated diene monomer having from 4 to 12 carbon atoms per molecule and thereafter adding a phosphite triester as coupling agent, wherein the phosphite triester is a tri(mixed mono- and dinonyl phenyl) phosphite added in an amount from about 0.15 to 1.1 mole per mol of the organolithium initiator.

2. A process according to claim 1 wherein the monovinyl aromatic monomer is styrene and the conjugated diene monomer is 1,3-butadiene.

3. A process according to claim 1 or 2 wherein the tri(mixed mono- and dinonyl phenyl) phosphite is used in the range of 0.25 to 0.5 mol per mol of organolithium initiator.

4. A process according to claim 1 wherein the tri(mixed mono- and dinonyl phenyl) phosphite is used in the range of 0.3 to 0.4 mol per mol of organolithium initiator.

5. A process according to claim 1 wherein the organolithium initiator is sec-butyllithium.

* * * * *